US009234748B2

(12) United States Patent
Bondurant et al.

(10) Patent No.: US 9,234,748 B2
(45) Date of Patent: *Jan. 12, 2016

(54) OPTICAL THREAD PROFILER

(71) Applicant: Quest Metrology, LLC, Kent, WA (US)

(72) Inventors: Phillip Dewayne Bondurant, Covington, WA (US); David William Rook, Kent, WA (US); David H. Bothell, Lake Tapps, WA (US); Christian Robert Lentz, Benton City, WA (US); David Jack Savage, Renton, WA (US)

(73) Assignee: Quest Metrology, LLC, Kent, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/474,067

(22) Filed: Aug. 29, 2014

(65) Prior Publication Data

US 2014/0368834 A1    Dec. 18, 2014

Related U.S. Application Data

(63) Continuation of application No. 13/493,806, filed on Jun. 11, 2012, now Pat. No. 8,860,952.

(60) Provisional application No. 61/495,083, filed on Jun. 9, 2011.

(51) Int. Cl.
*G01B 11/24* (2006.01)

(52) U.S. Cl.
CPC ............ *G01B 11/24* (2013.01); *G01B 11/2425* (2013.01)

(58) Field of Classification Search
CPC ............... G01B 11/24; G01B 11/2425; G01B 11/2518; G01B 11/2426; G01B 11/255; G01B 5/20; G01B 5/163; G01B 5/166
USPC ............................ 356/601–623, 241.1–241.5
See application file for complete search history.

(56) References Cited

U.S. PATENT DOCUMENTS

| | | | |
|---|---|---|---|
| 3,924,953 A | 12/1975 | Allard | |
| 4,315,688 A | 2/1982 | Pryor | |
| 4,644,394 A | 2/1987 | Reeves | |
| 5,521,707 A | 5/1996 | Castore | |
| 5,571,222 A | 11/1996 | Ludwig | |
| 7,490,411 B2 | 2/2009 | Matsumiya | |
| 8,860,952 B2 * | 10/2014 | Bondurant et al. | 356/602 |
| 2010/0110448 A1 | 5/2010 | Johnson | |
| 2010/0186242 A1 * | 7/2010 | Kipnes | 33/199 R |
| 2011/0085159 A1 * | 4/2011 | Levin et al. | 356/73.1 |
| 2011/0164244 A1 | 7/2011 | Honda | |

OTHER PUBLICATIONS

International Search Report and Written Opinion mailed Aug. 6, 2012, in International Patent Application No. PCT/US2012/041932, filed Jun. 11, 2012, 8 pages.

* cited by examiner

*Primary Examiner* — Hoa Pham
(74) *Attorney, Agent, or Firm* — Christensen O'Connor Johnson Kindness PLLC

(57) ABSTRACT

An apparatus configured to measure at least one physical characteristic of an threaded surface (e.g., an internally threaded surface) of an object is provided. The apparatus uses optical triangulation to perform non-contact characterization of the threaded surface. The apparatus can be used to characterize various aspects of the threaded surface, including generating the measurements required to produce a longitudinal cross-sectional profile of the threaded surface.

26 Claims, 16 Drawing Sheets

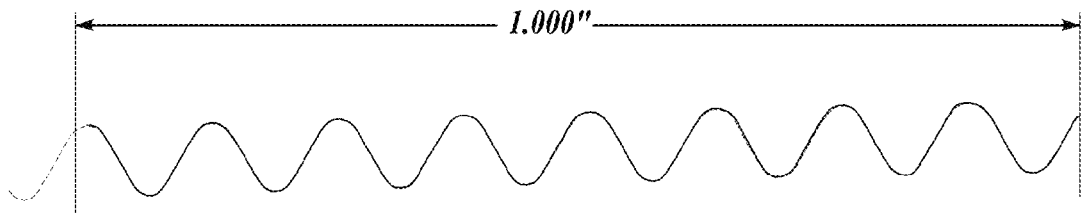

*THEORETICAL THREAD PROFILE IN DASHED LINE
ACTUAL SCAN PROFILE IN SOLID LINE*

*ROUND COUPLING THREAD 8 THREADS PER INCH,
0.071" THREAD HEIGHT, 0.375"/12" TAPER, ONE SIDE 0.020
0.020 TOP RADIUS, 60° INCLUDED ANGLE ON THREAD*

*Fig. 11.*

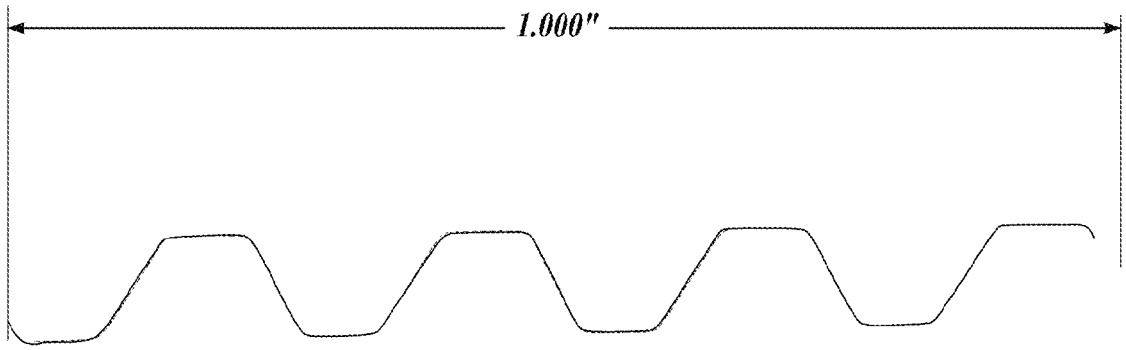

*THEORETICAL THREAD PROFILE IN DASHED LINE
ACTUAL SCAN PROFILE IN SOLID LINE*

*PAC 2-3/8 API THREAD, 4 THREADS PER INCH,
0.0925" THREAD HEIGHT, 1.500"/12" TAPER, ONE SIDE
FLAT ON CREST 0.076", 60° INCLUDED ANGLE ON THREAD*

*Fig. 12.*

THEORETICAL THREAD PROFILE IN DASHED LINE
ACTUAL SCAN PROFILE IN SOLID LINE 3-1/2 FULL HOLE API THREAD, 5 THREADS PER INCH TPI,
0.118" THREAD HEIGHT, 1.500"/12" TAPER, ONE SIDE
FLAT ON CREST 0.040", 60° INCLUDED ANGLE

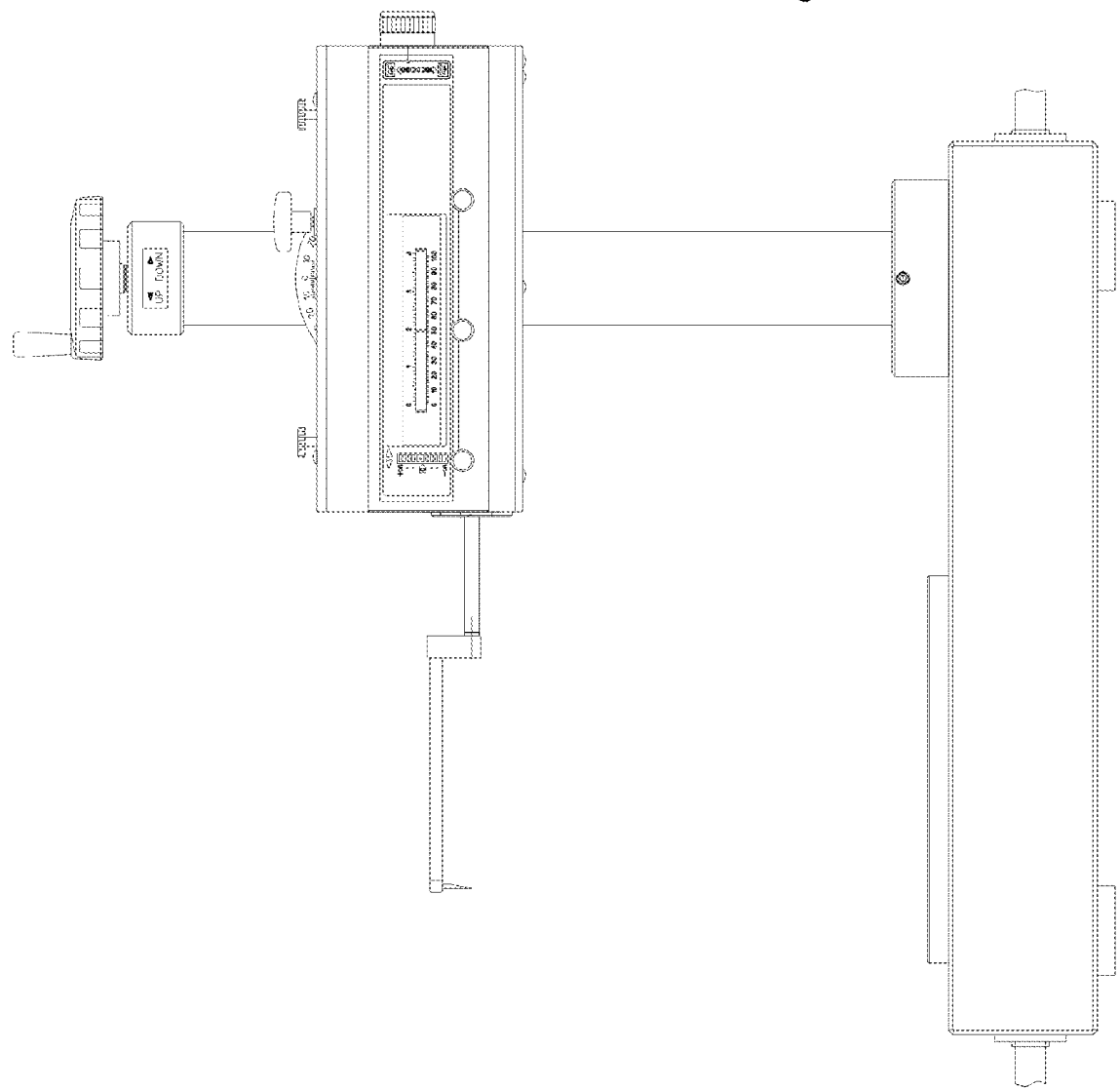

OPTICAL THREAD PROFILER

CROSS-REFERENCE TO RELATED APPLICATIONS

This application is a continuation of U.S. patent application Ser. No. 13/493,806, filed Jun. 11, 2012, which claims the benefit of U.S. Patent Application No. 61/495,083, filed Jun. 9, 2011, the disclosures of which are incorporated herein by reference in their entirety.

BACKGROUND

Current technologies for measuring at least one physical characteristic of an internally threaded surface, such as the shape of a thread form, include the casting or rubber replicating process, such as by Reporubber®, as illustrated in FIG. 14. The Reporubber® material is applied over several threads, allowed to cure, and is then removed. The material maintains its shape when removed. The resulting thread mold is sliced on-axis and placed on an optical comparator, where it is magnified. An overlay of the theoretical shape may be used to detect problem areas. This is a time consuming process and relies on the operator to perform the comparison, which can be subjective and requires a "trained eye."

Another current approach is to use a mechanical stylus to trace the thread form, such as with the use of a contour measuring system, as illustrated in FIG. 15. This method is time-consuming to setup and collect data. It is also fragile.

Accordingly, there exists a need for improved internal thread measurement systems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, an apparatus configured to measure at least one physical characteristic of an internally threaded surface of an object is provided, wherein the internally threaded surface comprises a central axis of the object defined by a plurality of peaks of the internally threaded surface in the longitudinal direction of the internally threaded surface, and wherein the internally threaded surface has a cylindrical latitudinal cross-section. In one embodiment, the apparatus includes:

(1) at least one motion stage configured to controllably move an optical head along a measurement axis of the internally threaded surface, wherein the measurement axis and the central axis lie in a common plane; and (2) the optical head, comprising:

(i) an emission optical element in optical communication with a first light source configured to emit a first incident light beam onto the internally threaded surface to generate scattered light off of the internally threaded surface at a measurement point;

(ii) a detector optical element in optical communication with a first detector configured to receive at least a portion of the scattered light from the measurement point, wherein the detector optical element has a receive axis defined by the measurement point, the detector optical element, and the first detector, and wherein the first detector is configured to output a detector signal indicative of the intensity and position of the scattered light on the detector;

wherein the optical head is configured and disposed such that the first incident light beam and the receive axis form a triangulation plane along with the measurement point on the internally threaded surface, and wherein a line parallel to a tangent of the cylindrical cross-section within the triangulation plane is substantially perpendicular to both the measurement axis and the central axis; and wherein the apparatus is configured to register to the internally threaded surface by making physical contact with the object in a plurality of contact locations, including at least two longitudinally spaced contact locations on the internally threaded surface.

In another aspect, a method of measuring a profile of an internally threaded surface using the apparatus described above is provided. In one embodiment, the method includes the steps of:

(a) positioning the optical head on the measurement axis;

(b) moving the optical head on the measurement axis adjacent the internally threaded surface;

(c) irradiating a plurality of measurement points along the internally threaded surface using the first light source; and (d) detecting scatter light generated at the plurality of measurement points by the first light source to provide a plurality of detector signal measurements; and (e) determining a plurality of distance measurements, each indicative of the distance from the optical head to a measurement point, using the plurality of detector signal measurements.

In another aspect, an apparatus configured to measure at least one physical characteristic of a threaded surface of an object is provided. The threaded surface includes a central axis of the object defined by a plurality of crests of the threaded surface in the longitudinal direction of the internally threaded surface, wherein the threaded surface has a cylindrical latitudinal cross-section. In one embodiment, the apparatus includes:

(1) at least one motion stage configured to controllably move an optical head along a measurement axis of the threaded surface, wherein the measurement axis is defined by a plurality of crests of the threaded surface in the longitudinal direction of the threaded surface and the central axis lie in a common plane; and (2) the optical head, comprising:

(i) an emission optical element in optical communication with a first light source configured to emit a first incident light beam onto the threaded surface to generate scattered light off of the threaded surface at a measurement point;

(ii) a detector optical element in optical communication with a first detector configured to receive at least a portion of the scattered light from the measurement point, wherein the detector optical element has a receive axis defined by the measurement point, the detector optical element, and the first detector, and wherein the first detector is configured to output a detector signal indicative of the intensity and position of the scattered light on the detector;

wherein the optical head is configured and disposed such that the first incident light beam and the receive axis form a triangulation plane along with the measurement point on the threaded surface, and wherein a line parallel to a tangent of the cylindrical cross-section within the triangulation plane is substantially perpendicular to both the measurement axis and the central axis; and wherein the apparatus is configured to register to the threaded surface by making physical contact with the object in a plurality of contact locations, including at least two longitudinally spaced contact locations on the threaded surface.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 11-13 are representative thread profiles measured by the thread profiler and compared to the theoretical ideal profiles, in accordance with aspects of the present disclosure;

FIG. 16 is a stylus thread profiler.

DETAILED DESCRIPTION

Figure 1:
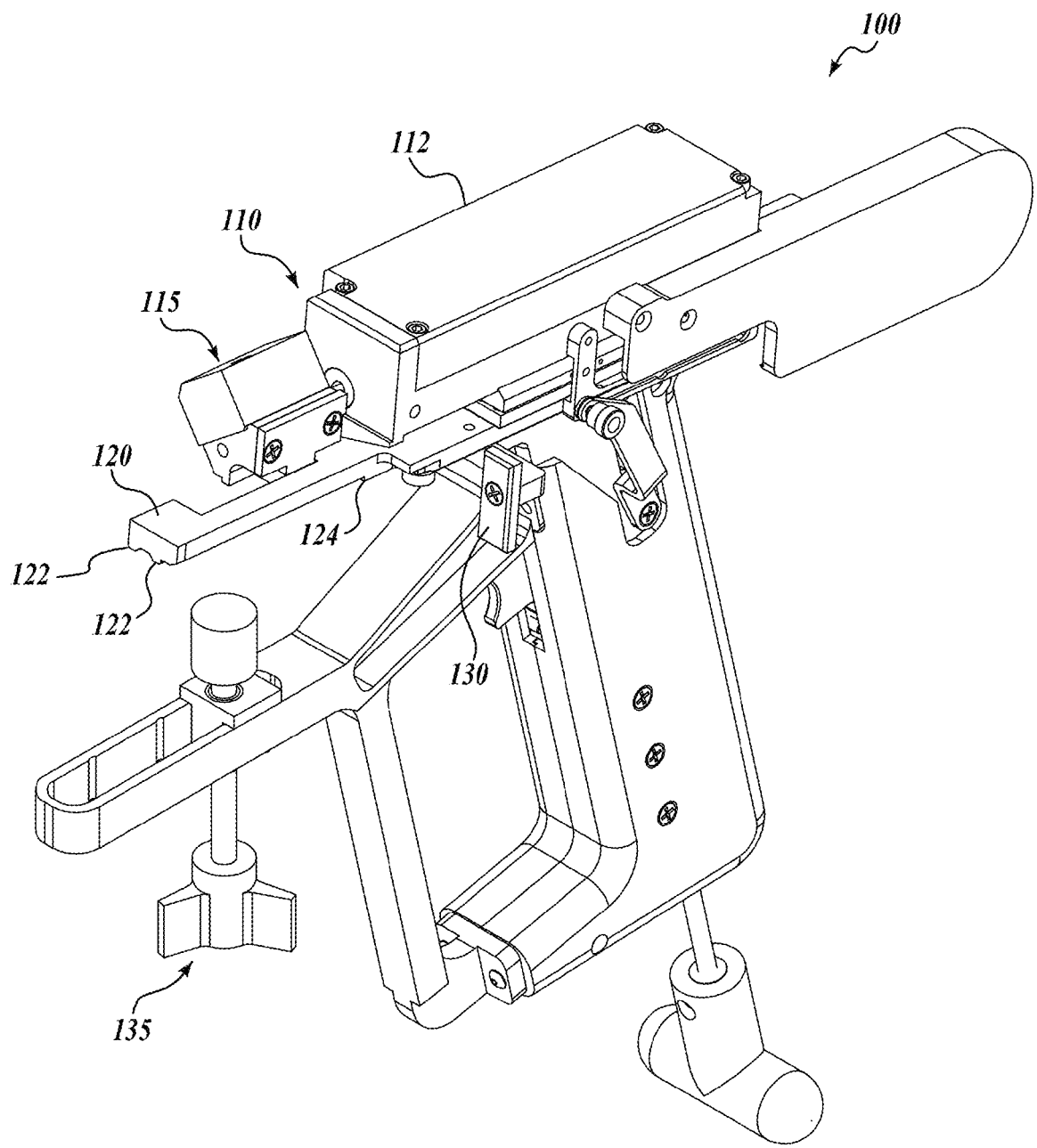
FIG. 1 is a perspective view of an embodiment of the thread profiler apparatus in accordance with aspects of the present disclosure.
Figure 2:
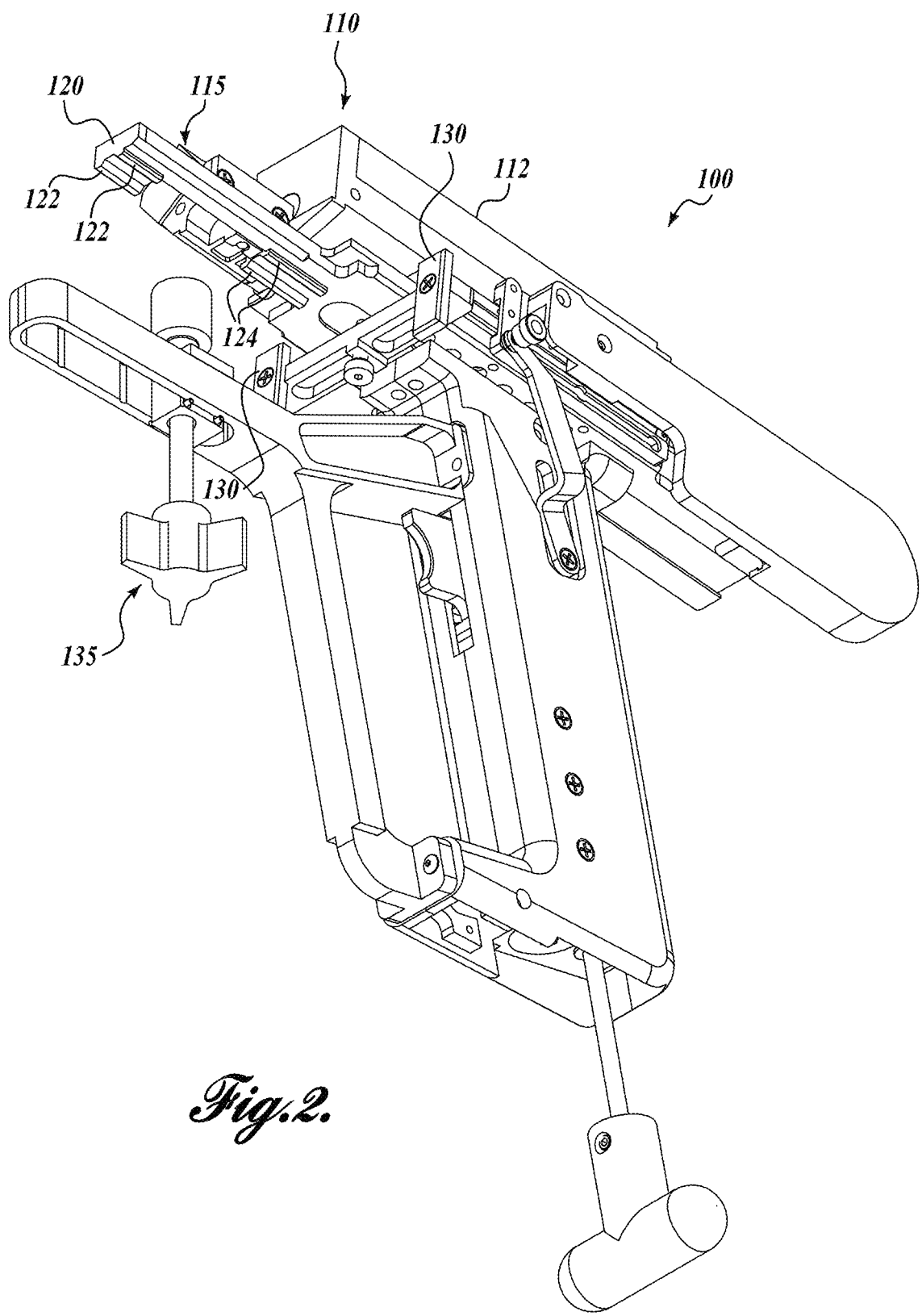
FIG. 2 is a perspective view of an embodiment of the thread profiler apparatus in accordance with aspects of the present disclosure.
Figure 3:
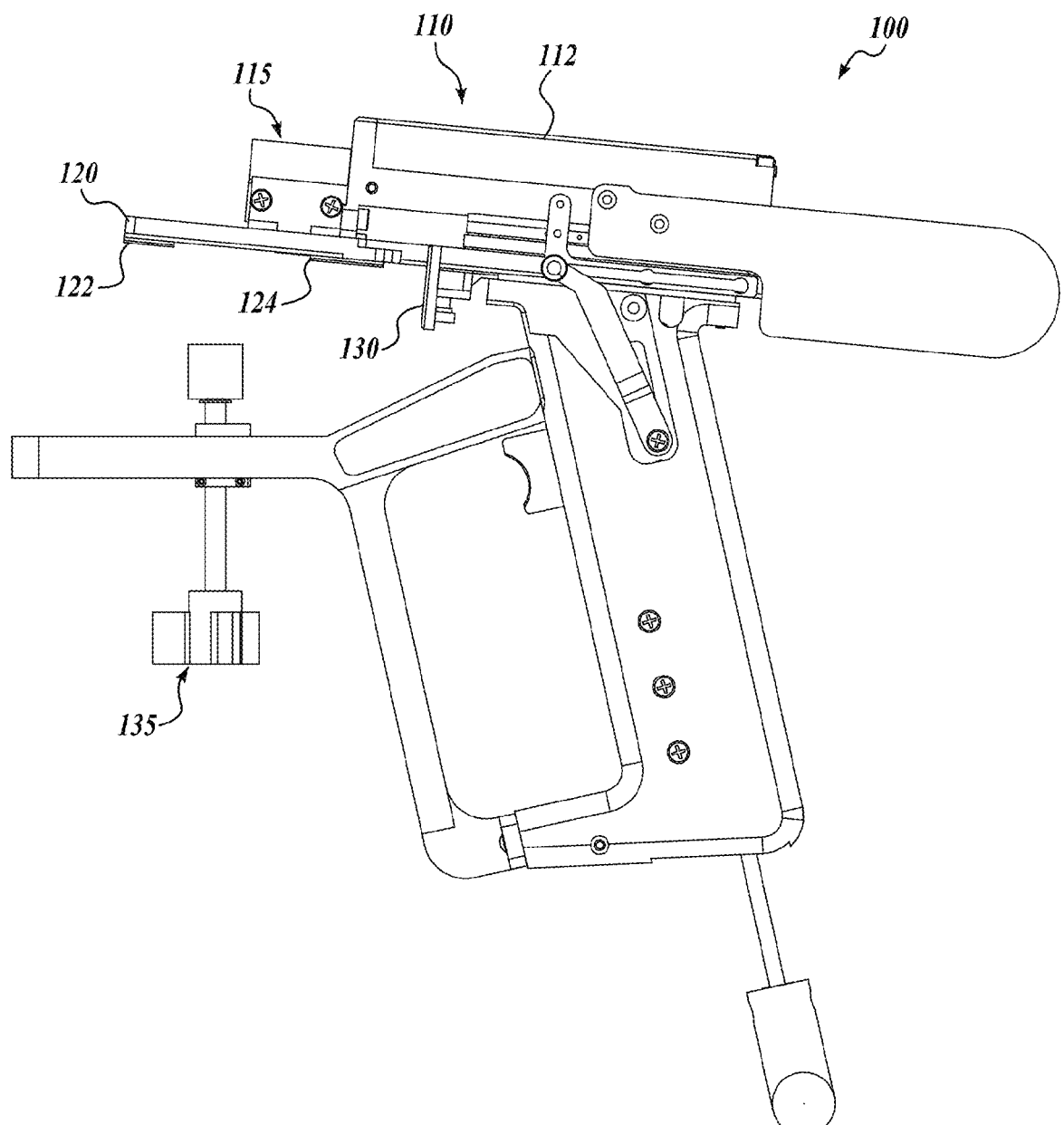
FIG. 3 is a side elevation view of an embodiment of the thread profiler apparatus in accordance with aspects of the present disclosure.

An apparatus configured to measure at least one physical characteristic of a threaded surface of an object is provided. The apparatus uses optical triangulation to perform non-contact characterization of the threaded surface. The apparatus can be used to characterize various aspects of the threaded surface, including generating the measurements required to produce a longitudinal cross-sectional profile of the threaded surface (referred to herein as a "thread profile"). Relatedly, the apparatus may be referred to herein as a "thread profiler."

The threaded surface can be any surface having a cylindrical or conical profile and a helical thread. Internally threaded pipes are exemplary objects that can be characterized using the profiler. The threaded surface includes a central axis of the object defined in the longitudinal direction of the threaded surface, and a cylindrical latitudinal cross-section.

The threaded surface can be a thread having a profile selected from the group consisting of screw threads, pipe threads, ACME threads, buttress threads, American Petroleum Institute threads, premium threads, and ultra-premium threads. However, any thread profile can be measured, beyond those listed herein.

A thread profiler 100 in accordance with aspects of the present disclosure will now be described with reference to FIGS. 1-4. The thread profiler 100 includes a motion stage 110 (e.g., a linear actuator) that positions an optical head 115 longitudinally along a measurement axis. The optical head 115 includes various optical components (e.g., lenses, optical fiber, a lights source, and/or a detector) for performing the optical triangulation measurements required to generate a thread profile of an internally threaded surface. The optical head 115 is in mechanical and electrical communication with a control unit 112, which may contain optical components (e.g., a lights source and/or a detector), parts of an actuator, and/or electronic components (e.g., control electronics for the optical components, computational components for processing data from the optical triangulation, and/or an actuator for the optical head 115).

In certain embodiments, the optical head 115 includes:

(i) an emission optical element in optical communication with a first light source configured to emit a first incident light beam onto the internally threaded surface to generate scattered light off of the internally threaded surface at a measurement point; and (ii) a detector optical element in optical communication with a first detector configured to receive at least a portion of the scattered light from the measurement point, wherein the detector optical element has a receive axis defined by the measurement point, the detector optical element, and the first detector, and wherein the first detector is configured to output a detector signal indicative of the intensity and position of the scattered light on the detector; wherein the optical head is configured and disposed such that the first incident light beam and the receive axis form a triangulation plane along with the measurement point on the internally threaded surface.

In certain embodiments, a line parallel to a tangent of the cylindrical cross-section within the triangulation plane is substantially perpendicular to both the measurement axis and the central axis.

The optical head 115 of the profiler 100 performs the basic distance measurement between the threaded surface and the optical head 115 as it passes over the threaded surface along the measurement axis. The optical head includes an emission optical element, which is intermediate a light source and the measurement point. The emission optical element may be one or more of a fiber, minor, lens, prism, or the like, as needed to properly guide the first incident light beam from the light source to the measurement point on the internally threaded surface. Similarly, the optical head includes a detector optical element that can be a fiber, minor, lens, prism, or the like, as needed to properly guide the scattered light to the first detector.

For example, if desired, the optical assembly may include a fiber-coupled infrared (or other wavelength) laser source having a lens mounted on the end of the fiber so that the light will be focused to a spot at approximately mid-point in the measuring range. The optical head 115 also may include a receive lens set that is used to project an image of the light scattered from the laser source at the measurement point on a photo detector (e.g., a charge-coupled device (CCD), one-dimensional complementary-metal-oxide-semiconductor (CMOS) array, or other pixelized photo detector). The optical head 115 may be calibrated as a unit on a separate fixture before it is installed. The separate fixture may be a calibration fixture that the system would measure to perform the calibration. Calibration of the optical assembly is typically necessary in this example because there is a non-linear (but repeatable) relationship between the detector response and the radial distance measured to the measurement point.

The thread profiler 100 may use a fiber-coupled laser source to minimize the physical size of the inspection head, such as for use in measuring small threads and small bore items. The fiber size may be chosen to achieve single-mode laser operation to minimize beam size and measurement errors due to any mode-hopping and allow focusing and beam steering by the fiber. Miniature optical elements, such as prisms and lenses, may be integrated on the end of the fiber for focusing and beam redirection. For measuring larger threads and use with items having larger bore diameters, the thread profiler may include a laser source and collimating lens system without the use of fibers. Some form of folded optics (such as minors), may be required to achieve a compact assembly while maintaining the necessary source and receiver optical paths.

The power of the laser may be controlled to allow proper exposure on different parts of the thread, as well as for different surface finishes. In certain embodiments, the proper exposure is based on the maximum received light level from previous samples. For example, if multiple reflections of the light are detected, and if the second reflection is larger in amplitude than the first reflection, other methods may be used, such as to analyze the entire detector response, select the correct reflection and then calculate the correct exposure. The detector location of the correct reflection can be estimated based on the approximate known thread geometry.

In one embodiment, at least one of the first light source and the first detector are distant from the optical head 115, such that when the apparatus 100 is used to measure the internally threaded surface, first light source and the first detector do not enter the object.

Figures 8A, 8B:
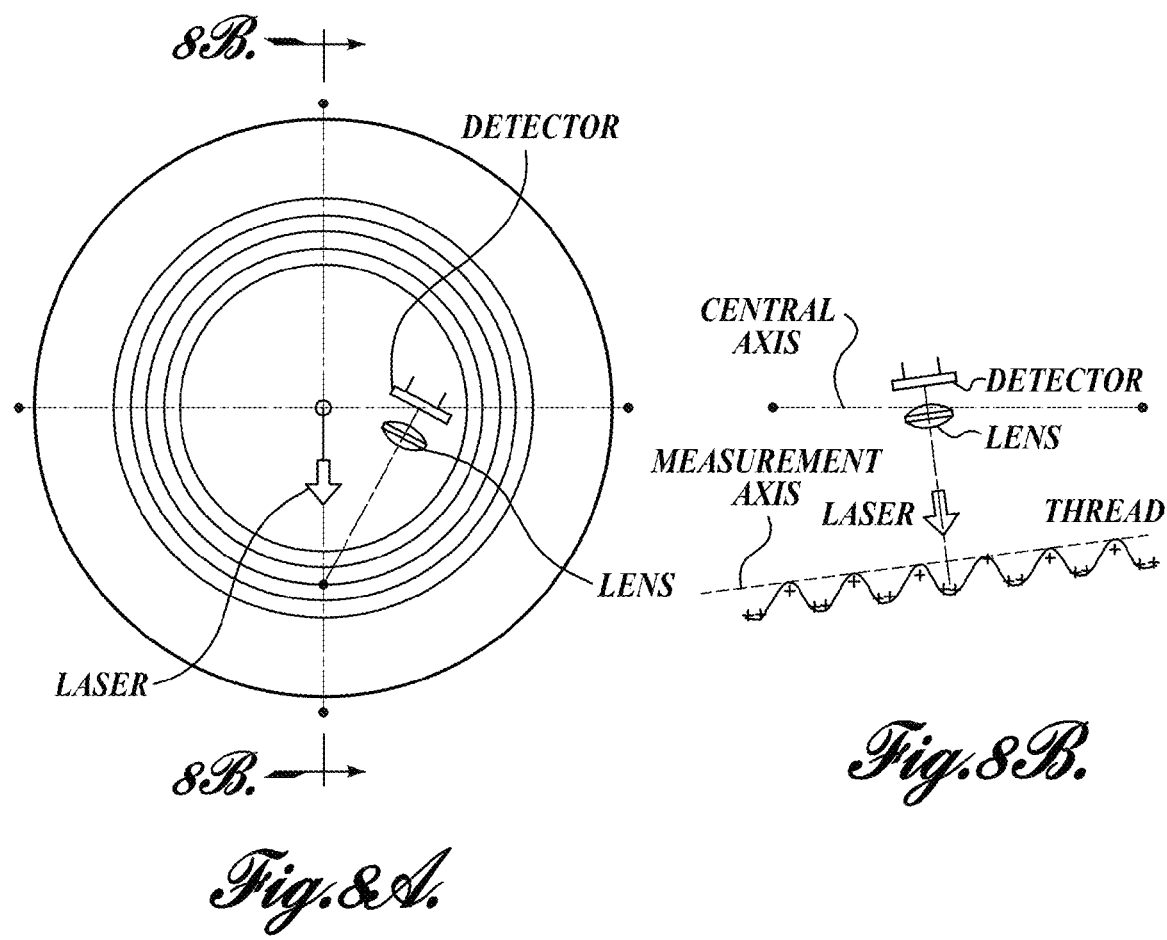
FIGS. 8A and 8B are views down the central axis (8A) and on longitudinal cross-section (8B) of an object having an internally threaded surface in relation to components of the thread profiler apparatus in accordance with aspects of the present disclosure.

In order to generate the most accurate thread profile, the optical head 115 must travel on a measurement axis that is parallel to a line drawn through the thread crests of the internally threaded surface (see FIG. 8B, "Measurement Axis"). The measurement axis may be in the same plane as the central axis (see FIG. 8B) of the object, as is the case with cylindrical threads, or the measurement axis may be angled with respect to the central axis, as is the case with tapered threads. In one embodiment, the measurement axis is substantially parallel (i.e., 5 degrees or less) to a taper angle of the internally threaded surface, such that the measurement axis and the central axis are not parallel.

So as to ensure that the optical head 115 travels on the proper measurement axis, the profiler 100 includes a support 120 that is an elongated member extending longitudinally away from the profiler in the direction of the measurement axis. The support 120 is disposed below the optical head 115 and is parallel to the measurement axis on which the optical head 115 extends.

The support 120 is configured to register the position of the apparatus 100 to the internally threaded surface by making physical contact with the object in a plurality of contact locations, including at least two longitudinally spaced contact locations on the internally threaded surface. By registering the position of the apparatus 100 to the internally threaded surface, the taper angle of a thread is accounted for and the measurement axis is adjusted accordingly.

In the embodiments illustrated in FIG. 1-4, the plurality of contact locations include two distal contact surfaces 122, two proximal contact surface 124, and two external contacts 130. The contact surfaces 122 and 124 are configured to contact the internally threaded surface. Accordingly, they are elongated in the direction of the measurement axis so as to ensure that each contact surface 122 and 124 rests on at least one thread crest.

It will be appreciated that balls or other contact surface forms can also be used. However, if balls or other forms are used, steps must be taken to ensure that the contact surfaces each contact the thread crest in the same manner. For example, if balls are used, each ball must be disposed such that it touches a thread crest or sits in the thread groove, so as to not skew the measurement angle.

The contact surfaces 122 and 124 illustrated in the embodiments of FIG. 1-4 are paired, such that there are two distal contact surfaces 122 and two proximal contact surfaces 124. However, the profiler 100 can incorporate the contact surface 122 and 124 in a number of combinations, including: two distal contact surfaces 122 and one proximal contact surface 124 or two proximal contact surfaces 124 and one distal contact surface 122. Therefore, in one embodiment, the apparatus is configured to make physical contact with the internally threaded surface at two contact locations distal to the apparatus and one contact location proximal to the apparatus. In one embodiment, the apparatus is configured to make physical contact with the internally threaded surface at two contact locations proximal to the apparatus and one contact location distal to the apparatus. In one embodiment, the apparatus is configured to make physical contact with the internally threaded surface at two contact locations distal to the apparatus and two contact locations proximal to the apparatus. In one embodiment, the apparatus is configured to make physical contact at two contact locations on an exterior surface of the object, wherein the exterior surface is perpendicular to the central axis of the internally threaded surface. In one embodiment, the apparatus further comprises a plurality of contact surfaces, each extending parallel to the measurement axis, and wherein the plurality of contact surfaces are configured to provide the plurality of contact locations on the internally threaded surface.

In the illustrated embodiment, the external contacts 130 are shaped as paddles perpendicular to the internally threaded surface, so as to contact the face of the object, which is typically the reference surface used for forming an internal thread. However, the embodiments of the profiler 100 are not limited to use on threads having a face perpendicular to the internally threaded surface. Additionally, the external contacts 130 need not be paddles, as illustrated, but can be of any shape and configuration that provides the necessary registration of the profiler to the correct measurement axis.

The configuration of the contact surfaces 122 and 124 required to properly register the profiler 100 on the measurement axis relates to whether or not external contacts 130 are used. For American Petroleum Institute (API) style threads, the front face of the object (e.g., pipe) provides a convenient reference location to establish the measurement axis in the same plane as the central axis. This requires a minimum of two points on the front face. Also, because the front face is a relatively large area, the two points can be sufficiently separated such that it provides a high degree of accuracy and repeatability. All thread profile geometry is based on slicing the thread through the central axis.

The second reference requirement is to position the measurement axis such that it is substantially parallel to the thread inner surface. There are two reasons for this. First, this minimizes the required measuring range of the optical triangulation sensor. Second, it assures that the angle between the triangulation plane and the thread flanks is consistent. This is particularly important when this angle is acute. This second reference is established by at least one contact point each at the distal and proximal ends of the thread profiler (i.e., via the support).

The third reference establishes the angular position of the light source (and associated receive axis) relative to the plane established by the central and measurement axis. This reference is established by using two contact points separated in the latitudinal direction. The two contact points can be located either at the distal or proximal end of the thread profiler. This provides a minimum of 3 contact points on the inner thread surface that serve to provide the second and third reference requirements. Two latitudinally separated reference points on the inner surface can also provide the first reference to keep the measurement axis and central axis in the same plane; however it will not be as accurate. For threads without an accurately machined front fact, this will be the only method of alignment. The accuracy required will depend on the size of the thread, the larger the thread, the less the axis alignment requirement.

In one embodiment, the plurality contact locations are contacted simultaneously to the threaded surface in order to register the position of the apparatus in relation to the internally threaded surface. Such an embodiment is illustrated in FIGS. 1-5, wherein the contact surfaces 122 and 124, and external contacts 130 all contact the object. In other embodiments, however, the plurality of contact locations are contacted separately, such as in a robotic system wherein the contact locations are contacted as reference points to define the measurement axis on which the robotic system should move the optical head.

The motion stage 110 is useful to translate the optical head 115 along the measurement axis as data is collected and stored. Ideally, this motion is smooth and at a reasonably consistent velocity—the consistency of which depends on how well the measurement instant is synchronized with the axis position information as well as the variation in geometry of the threaded surface—such that the optical assembly moves in a straight line with minimal Abbe errors. The motion stage 110 may include a linear bearing to assure smooth motion, an encoder to synchronize the data collection with the stage position, and/or a passive drive mechanism to actuate the motion. If used, an encoder provides synchronized position output versus the laser-measured thread height to accurately determine thread profile. A finger actuated trigger may be included to initiate the inspection motion.

The thread profiler 100 requires smooth vibration-free motion as it scans the surface of the threads. This may be obtained by using a firm connection between the thread profiler and the item to be inspected, such as described above. Ideally, the tool also should minimize internal vibrations during the measurement process. For example, an electric motor and drive mechanism may be included, but would increase complexity and cost and add moving parts. As another example, a hydraulically dampened spring driven device using a single compression spring or dual compression springs to attempt to achieve a linear motion velocity may be used.

Constant velocity is useful because it maintains a consistent number of height measurements per unit distance traveled. Although the height measurements are collected at known longitudinal axial distances within the item to be measured by using an encoder, the spacing between the samples may become too large if the optical head 115 is moving too fast. For example, the mechanism used to drive the optical head 115 may include an Airpot unit, which dampens the driving force supplied by constant force springs. Providing a uniform velocity for the optical head 115 is believed to achieve the uniform sampling requirement. The Airpot unit may, for example, include one or more springs and a commercially available air cylinder device having a precisely matched piston sliding over a polished bore to assure smooth vibration-free motion of the piston and not require any electrical power.

A uniform velocity also reduces height measurement offsets when measuring on the flanks. Ideally, the encoder position should be read at the middle of the measurement exposure to eliminate this source of error. In certain embodiments, thread profiler 100 uses a short light exposure time, as well as a slow velocity, to minimize this error source. If the exposure or velocity increases, this effect must be mitigated, such as by synchronization of the exposure/light source with the encoder.

In the illustrated embodiment of FIG. 1-4, the profiler 100 is configured to secure to the object having the internally threaded surface. While any securing mechanism known to those of skill in the art can be used, including magnets and suction, a releasable clamp 135 is used in the illustrated embodiment. The clamp 135 can be tightened on an exterior surface of the object, so as to position the support 120 on the internally threaded surface. As an example, FIG. 5 illustrates the profiler 100 immobilized against an internally threaded pipe 200 using the clamp 135. The profiler 100 is positioned in relation to the threads of the pipe 200 by the support 120, which in turn positions the optical head 115 such that it can be extended above the internal threads in order characterize the internally threaded surface (e.g., to generate a thread profile).

In the embodiment illustrated in FIGS. 1-5, the clamp 135 includes a hand-operated knob, such as on the bottom of the profiler 100, which may be tightened to assure a firm contact between the thread profiler 100 and the item to be inspected. The thread profiler may include a reference contact point to be held snug against the face of the item to be inspected. In this example, the face of the item serves as the perpendicular reference for the axis of the thread. The thread profiler may include one or more engaging teeth to assist in pulling or maintaining the thread profiler against the reference face of the item to be inspected.

In one embodiment, the apparatus includes at least one magnet configured to secure the object to the apparatus and to register the apparatus in a position in relation to the object.

In one embodiment, the apparatus is portable. The embodiment illustrated in FIGS. 1-5 is sized and configured to be hand-held and portable, such that the profiler 100 can be brought to the object, as opposed to the profiler 100 being fixed in space and bringing the object to the profiler 100. Accordingly, the profiler 100 includes all of the necessary components to generate a thread profile while being held in the user's hand.

Figure 4:
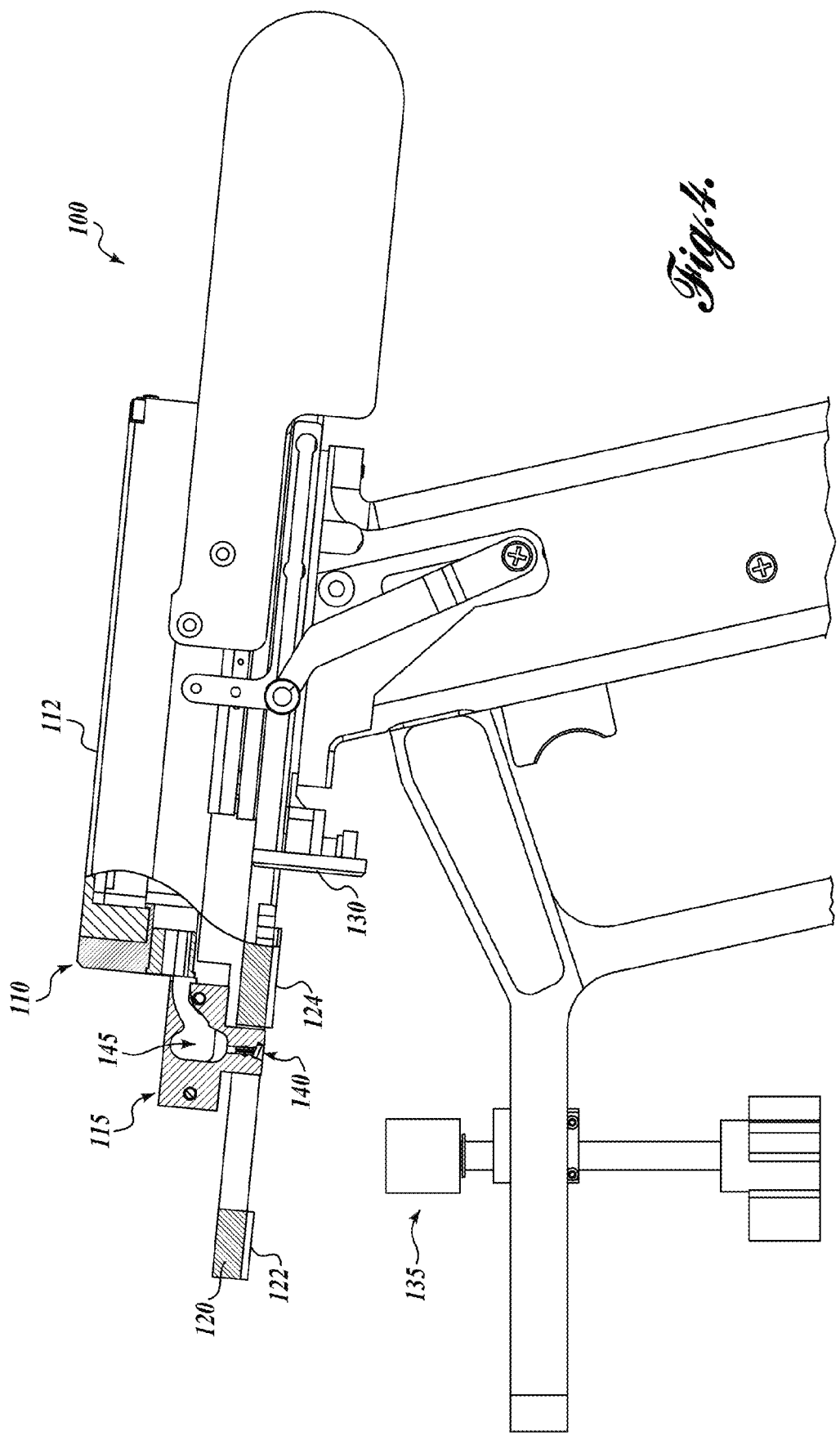
FIG. 4 is a partial cut-away side elevation view of an embodiment of the thread profiler apparatus in accordance with aspects of the present disclosure.
Figure 5:
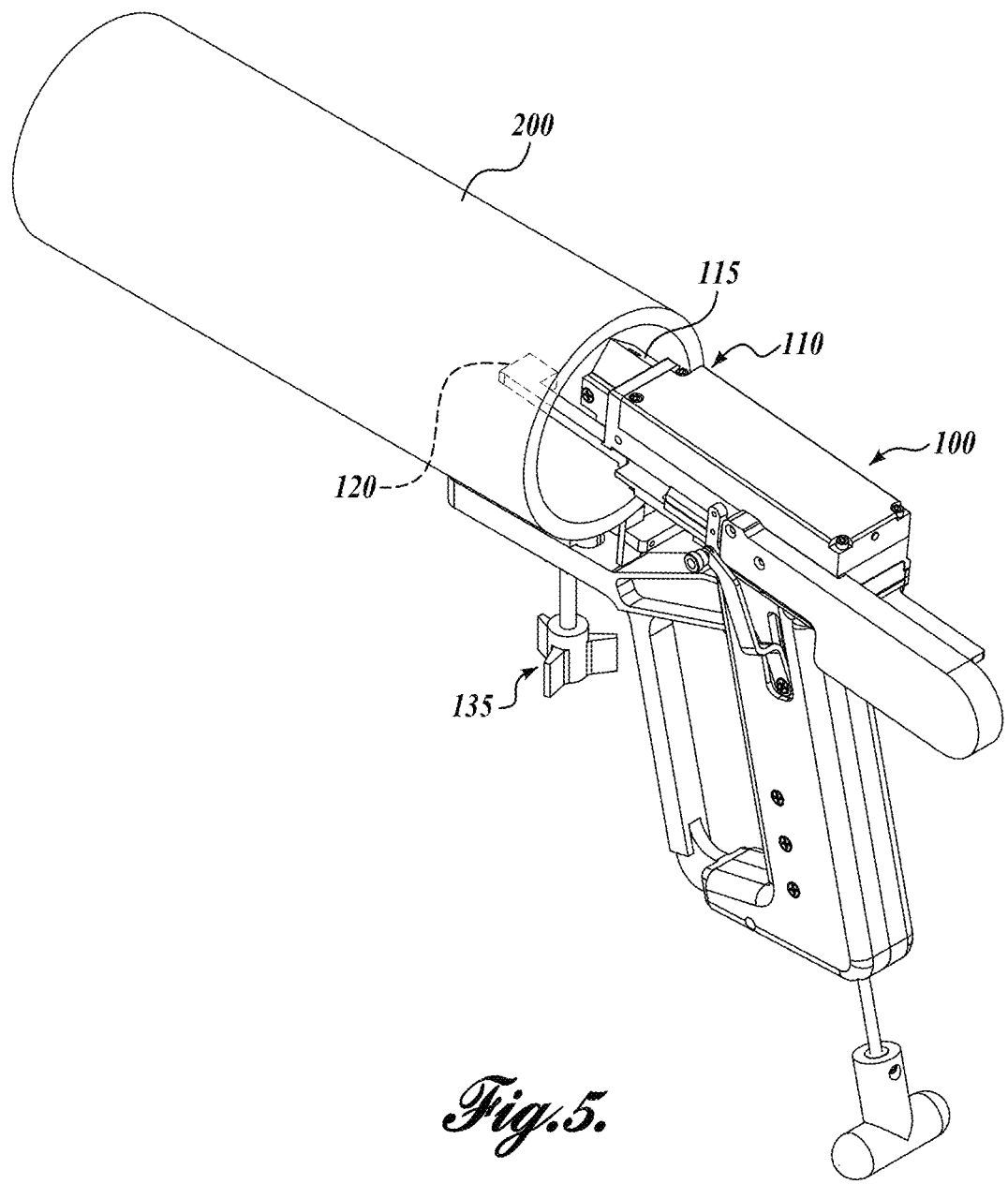
FIG. 5 is illustrates a representative use of an embodiment of the thread profiler apparatus to measure an internally threaded pipe, in accordance with aspects of the present disclosure.

The optical head 115 is shown in cut-away in FIG. 4, so as to illustrate that the optical head 115 includes an opening 140, through which both a light emission signal and a receive axis for light detection pass. A cavity 145 allows for the arrangement of optical elements for emission and/or detection to be arranged. These components may include lenses, minors, filters, optical fibers, and the like. A light source and/or a detector may also be packaged into the optical head 115/cavity 145, although such components are typically too large to fit into the optical head 115. Accordingly, in certain embodiments, the light source and detector are contained within the body of the profiler 100 and do not extend into the object with the optical head 115.

Figure 6:
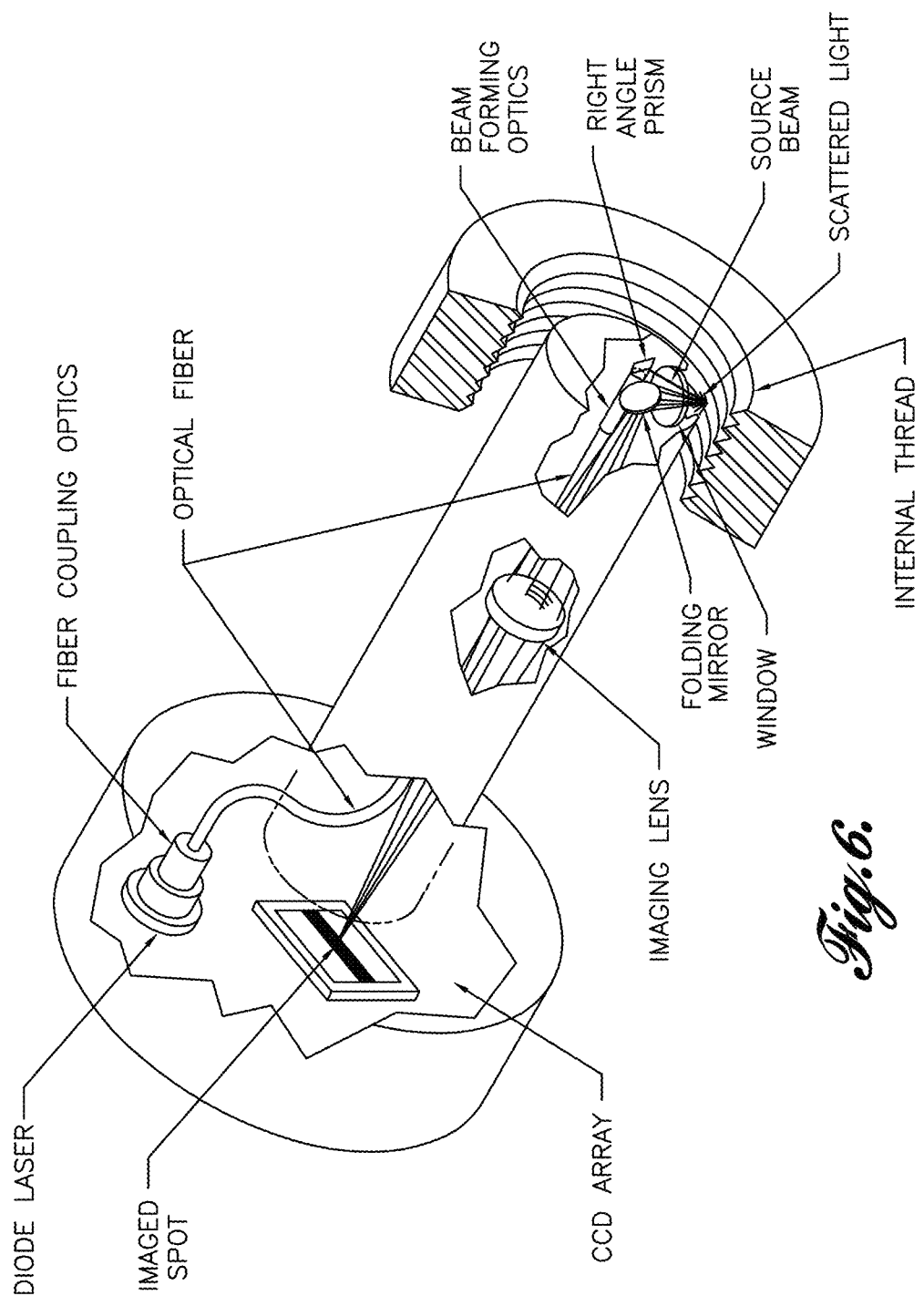
FIG. 6 is a partial cut-away view of an embodiment of the thread profiler apparatus in accordance with aspects of the present disclosure shown measuring a threaded surface.

FIG. 6 illustrates a representative emission/detection system, such as can be used with the optical head 115 in FIGS. 1-5. The system includes a laser as the light source, which is coupled to an optical fiber for transmission of light to the distal end of the optical head, where it is emitted through the beam-forming optics (e.g., a lens or prism). The light is emitted onto a measurement point on the internal thread, which generates scattered light. The scattered light is captured by a minor that directs through an imaging lens onto a point ("spot") on a CCD array detector. According to the principles of optical triangulation, the position of the imaged spot on the detector varies as the distance between the surface of the internal thread and the optical head changes, as will be described in more detail below. While specific components (e.g., laser, CCD, fiber, mirror, lens, etc.) are disclosed in this embodiment, it will be appreciated that any components can be used as long as optical triangulation is facilitated so as to measure the distance between the optical head and the internally threaded surface. For example, a light-emitting diode can be used instead of a laser and/or any pixilated photo detector can be used instead of the CCD detector, etc.

The thread profiler apparatus and methods of the present disclosure utilize optical triangulation. Optical triangulation is a geometric approach to measuring distance, where a focused beam of light is projected onto the surface to be measured and the reflected light is imaged onto a position-sensitive photo detector.

Figure 7:
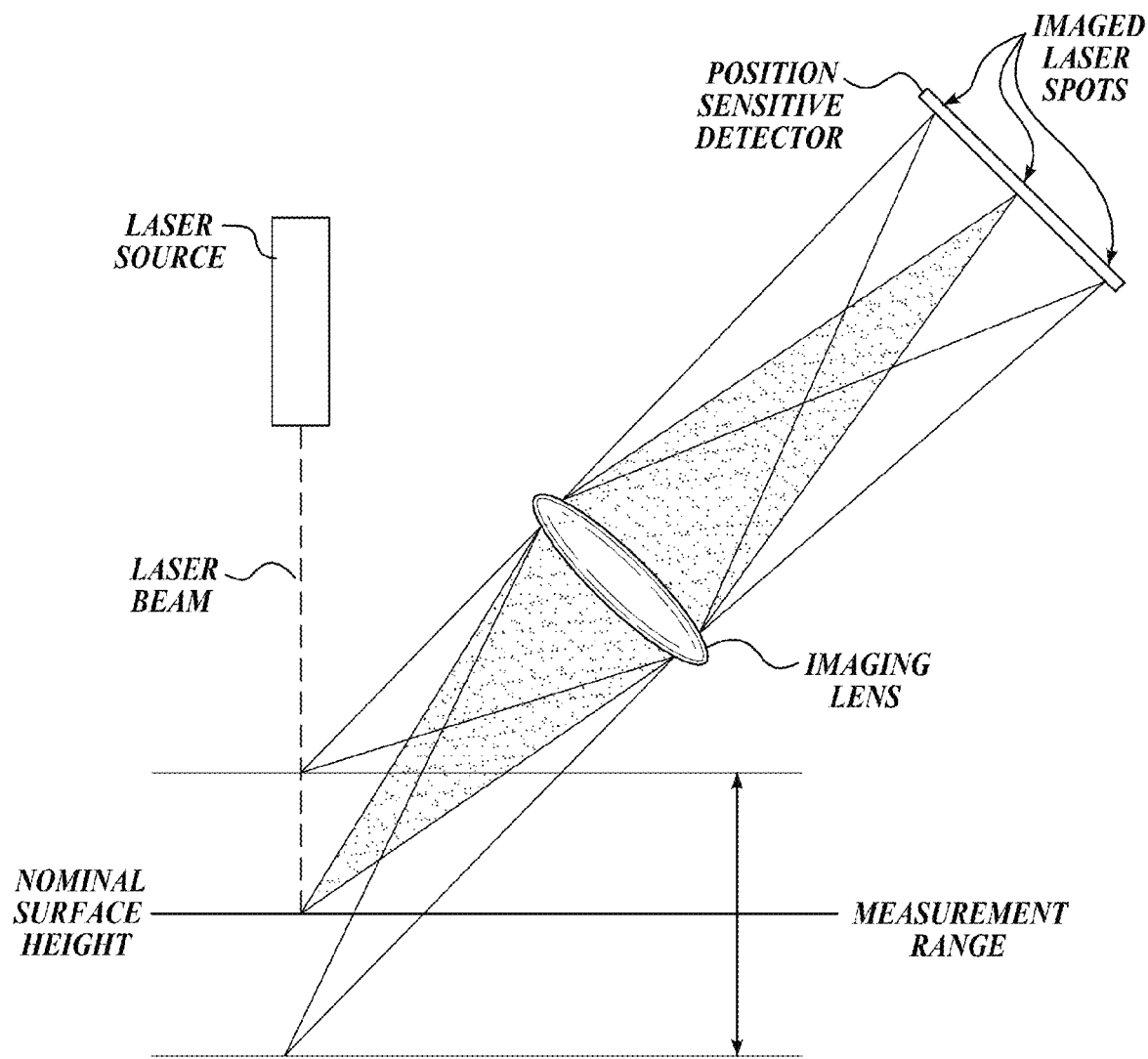
FIG. 7 is a diagrammatic representation of principles of optical triangulation as performed by embodiments of the thread profiler apparatus in accordance with aspects of the present disclosure.

Referring to the exemplary embodiment of FIG. 7, components of an exemplary thread profiler in accordance with the present disclosure includes a laser light source, an imaging lens as an optical element, and position-sensitive photo detector. As described herein, these components may be housed together in a single apparatus or a single optical probe. The optical probe housing may provide a fixed and stable geometry between the components. The photo detector may, in some applications, be a one-dimension pixelized detector, similar to the two-dimensional detectors used in cameras.

The angle between the light projection axis ("laser beam") and the receive axis of the imaging lens allows for measurement of the position of the measurement point in relation to the optical head. The receive axis extends between the focused spot of light at the measurement point on the thread surface and the center of the imaging lens. Changing the distance between the optical head and the thread surface pivots the receive axis slightly about the imaging lens, which in turn causes the position of the imaged spot on the position-sensitive photo detector to change location. A larger average angle between the projection and receive axis causes a larger position change on the position sensitive photo detector. This angle may be selected depending upon the particular design. For example, this angle may be in the range of 20 to 45 degrees in some applications.

In the first representative measurement geometry, as shown in FIGS. 8A and 8B, the optical triangulation plane is substantially perpendicular (i.e., within the helix angle of the thread) to the thread axis. The optical triangulation plane is the plane created by the light source ("laser") beam and the receive axis (e.g., the center of the receive lens. The triangulation plane is substantially perpendicular to the measurement axis in one plane, while the other plane stays perpendicular to the central axis. This geometry is referred to herein as the "perpendicular geometry" because the triangulation plane is substantially perpendicular to the measurement axis.

Figures 9A, 9B:
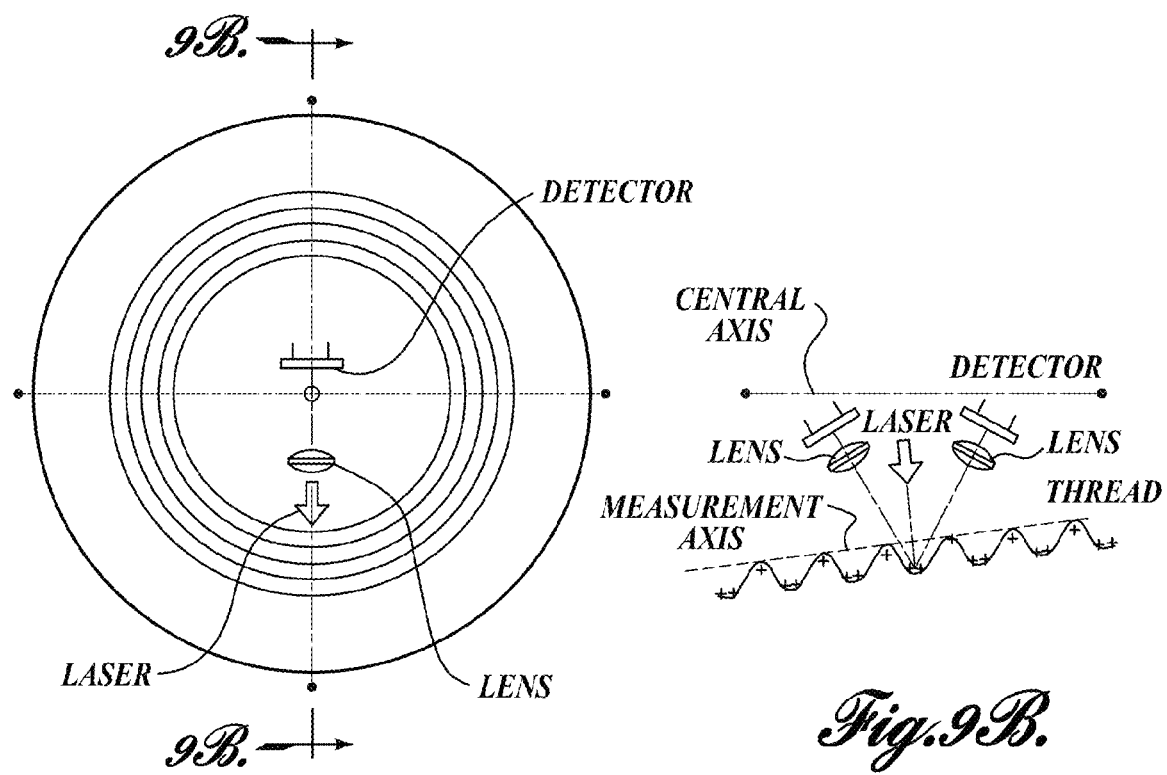
FIGS. 9A and 9B are views down the central axis (9A) and on longitudinal cross-section (9B) of an object having an internally threaded surface in relation to components of the thread profiler apparatus in accordance with aspects of the present disclosure.

In the second representative measurement geometry (the "parallel geometry"), the triangulation plane is parallel to the axis of the thread, but will require two receive axes fore and aft of the laser source, as illustrated in FIGS. 9A and 9B. A fore sensor is used for one flank of the thread and an aft sensor is used for the other flank as the optical head traverses the thread. Accurate results may be difficult to obtain if the optical receive axis is shallow with respect to the flank surface; therefore the receive path having an axis closest to a perpendicular angle with respect to the flank is preferred for a specific flank. This approach typically requires a smaller triangulation angle to reach the roots of the thread (compared to the perpendicular geometry), increasing the measurement noise due to surface reflectivity variations. This particular geometry suffers from added complexity, such as in the additional number of components and the need to collect profile data from two different sensors. However, this geometry provides twice as much data in the roots and crests of the thread because both sensors will see the crests, because neither is shadowed; therefore twice as much data will be collected.

Still with reference to use of the exemplary embodiments, it may, in some applications, be useful to have the laser source perpendicular to the surface tangent plane for measurement purposes. If the laser is not perpendicular to the surface, the point on the surface where the laser beam of this embodiment strikes the surface moves circumferentially around the thread as the radius of the thread changes. This consideration may be more important for smaller diameter threads because of the tight radius of curvature.

In an example operation of the illustrated thread profiler, processing of data from the sensor(s) requires first reflection (of light off the thread surface) to be analyzed. This is the reflection that represents the smallest radii, which is important when the parallel measurement geometry is used, as the secondary reflection from the opposing flank is within the field of view of the detector(s). The laser light will reflect off of the first flank, reflect further down into the thread root and then reflect off of the opposing flank. The perpendicular measurement geometry may have a similar problem if there is debris in the thread root and depending on the reflectance distribution of the thread surface and the debris surface.

In certain embodiments, the detected signal is processed so as to identify the first reflection from several reflection signals. In a highly-reflective environment or for certain thread shapes and surface finish, the first reflection may not be the highest intensity peak at the detector. In such a situation, all reflections are identified and because the overall thread geometry is approximately known (the operator will know what type of thread that is being inspected) the spurious peaks can be eliminated because they will deviate significantly from overall thread form. This method can also be used in situation where the first reflection is not the correct location or if the correct location does not provide a detectable reflection on the detector.

In certain embodiments, a line parallel to a tangent of the cylindrical cross-section within the triangulation plane is substantially perpendicular to both the measurement axis and the central axis. In order to clarify the spatial organization of the profiler, FIGS. 14A and 14B illustrate representative embodiments of components of a profiler arranged in relation to an internally threaded surface.

Figure 14A:
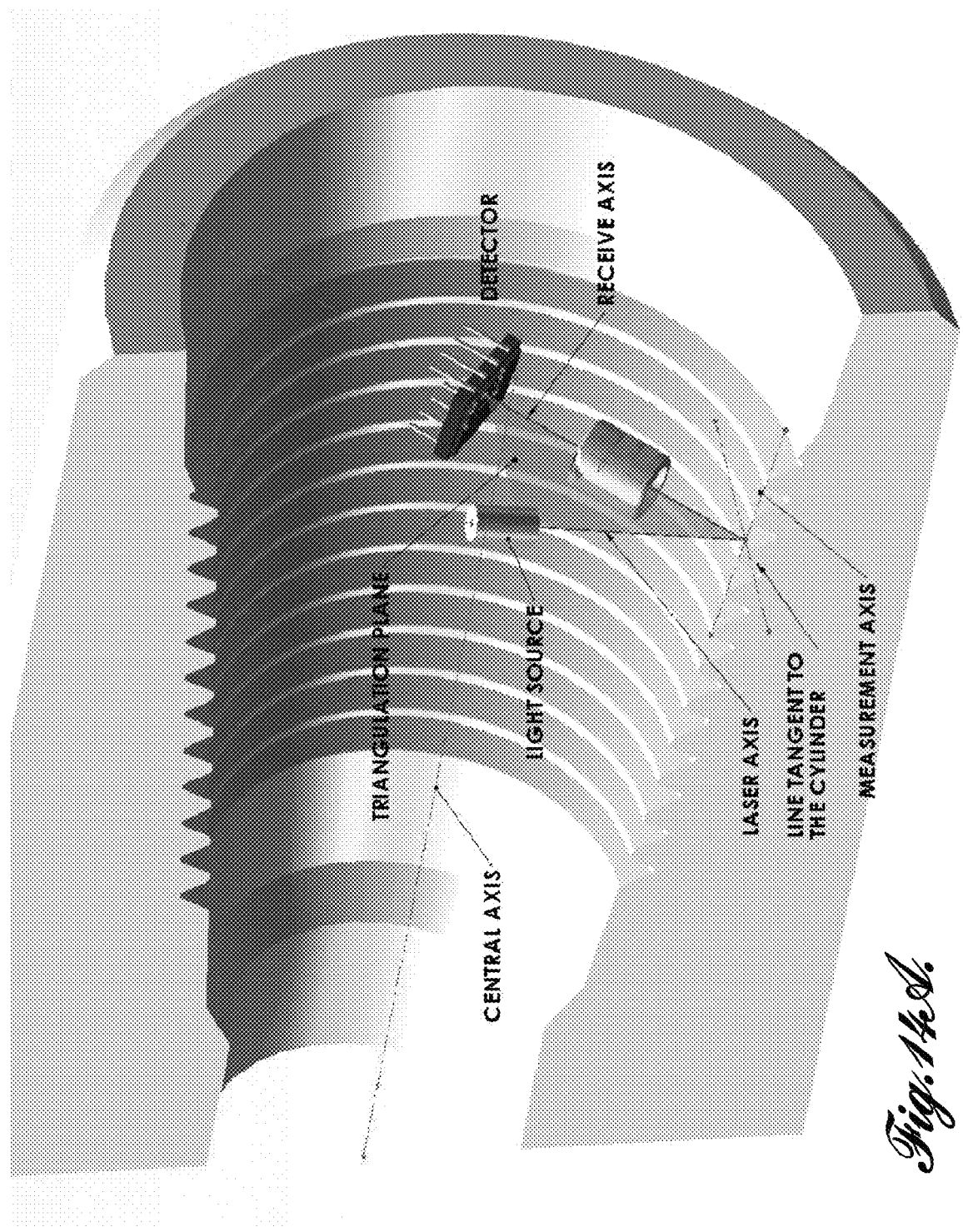
FIGS. 14A and 14B are diagrammatic illustrations of an object having an internally threaded surface in relation to components of the thread profiler apparatus in accordance with aspects of the present disclosure.
Figure 14B:
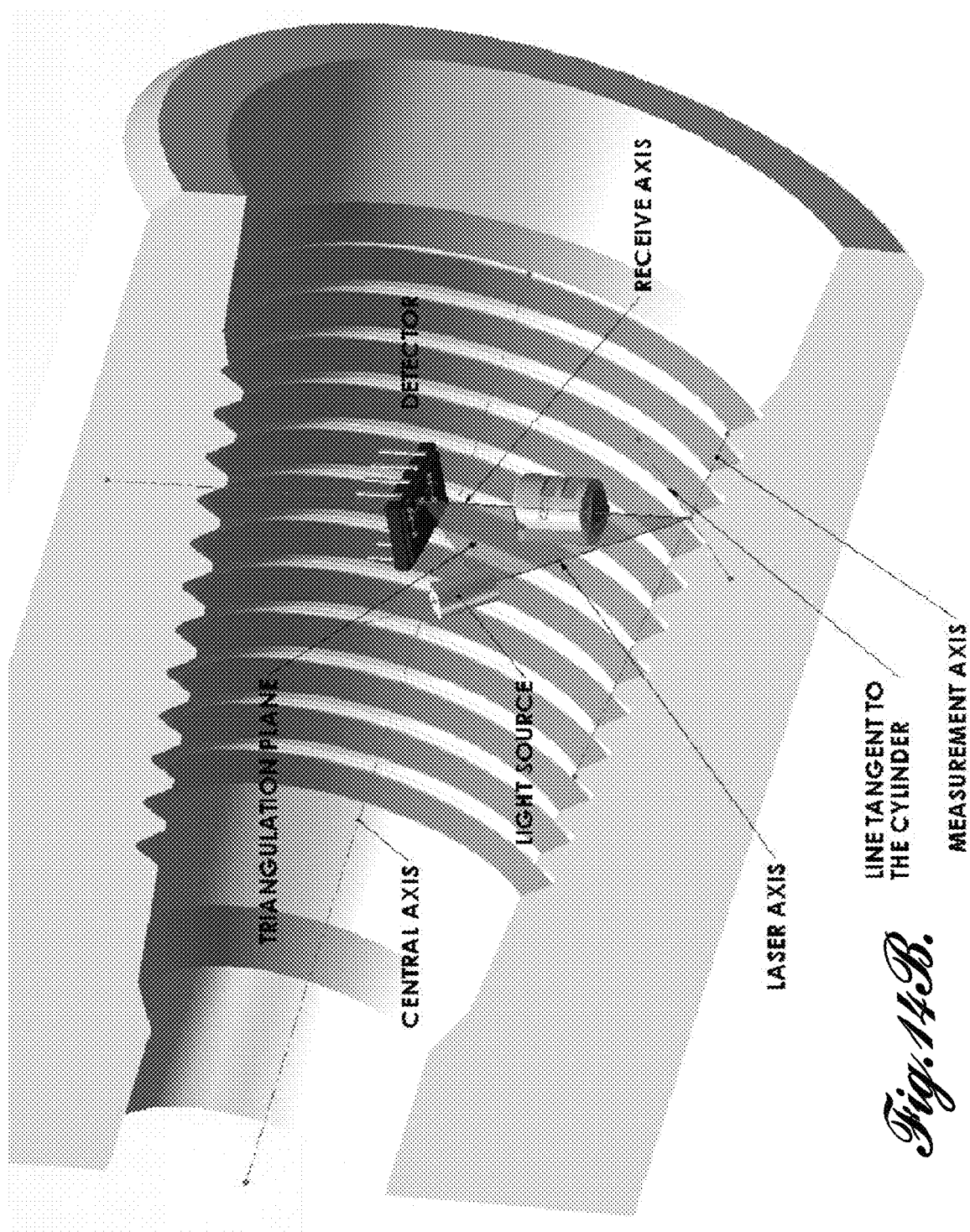
Figure 15:
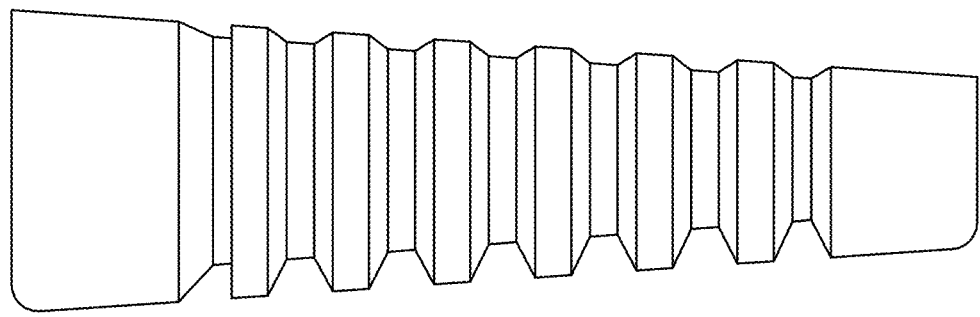
FIG. 15 is an illustration of Reporubber® used to characterize a thread profile.

FIGS. 14A and 14B illustrate the preferred measurement geometry. The optical triangulation plane is defined by the laser axis, receive axis and the measurement point. The central axis of the thread and the measurement axis both lie in the same plane such that the plane cuts in a radial direction through the threads. The line tangent to the cylinder is shown at the thread surface and is perpendicular to the measurement axis. The triangulation plane is oriented such that when projected will substantially include the tangent line within normal helix angle variations. FIG. 14A illustrates the optical triangulation plane in substantially the same plane as a latitudinal cross-section of the object. In order to measure steep thread flank angles, the optical triangulation plane may be tilted aft or fore, as illustrated in FIG. 14B.

In certain embodiments, the apparatus is configured to interface with a computer, or includes a computer configured to transform the detector signal into a measurement of the distance from the optical head to the measurement point using the optical triangulation geometry, as known to those of skill in the art.

A standard personal computer (PC) compatible computer is used in connection with this embodiment to collect, process, and store the data. In this example, a Universal Serial Bus (USB) cable is used to power the device through the PC compatible laptop computer. However, it will be appreciated that all of the computing functions can be contained within the body of the profiler 100. For example, an embedded computer with a USB interface can be used to coordinate the data collection, preprocess the data from the detector, control the laser and format the data for transfer to a separate computer.

Figure 10:
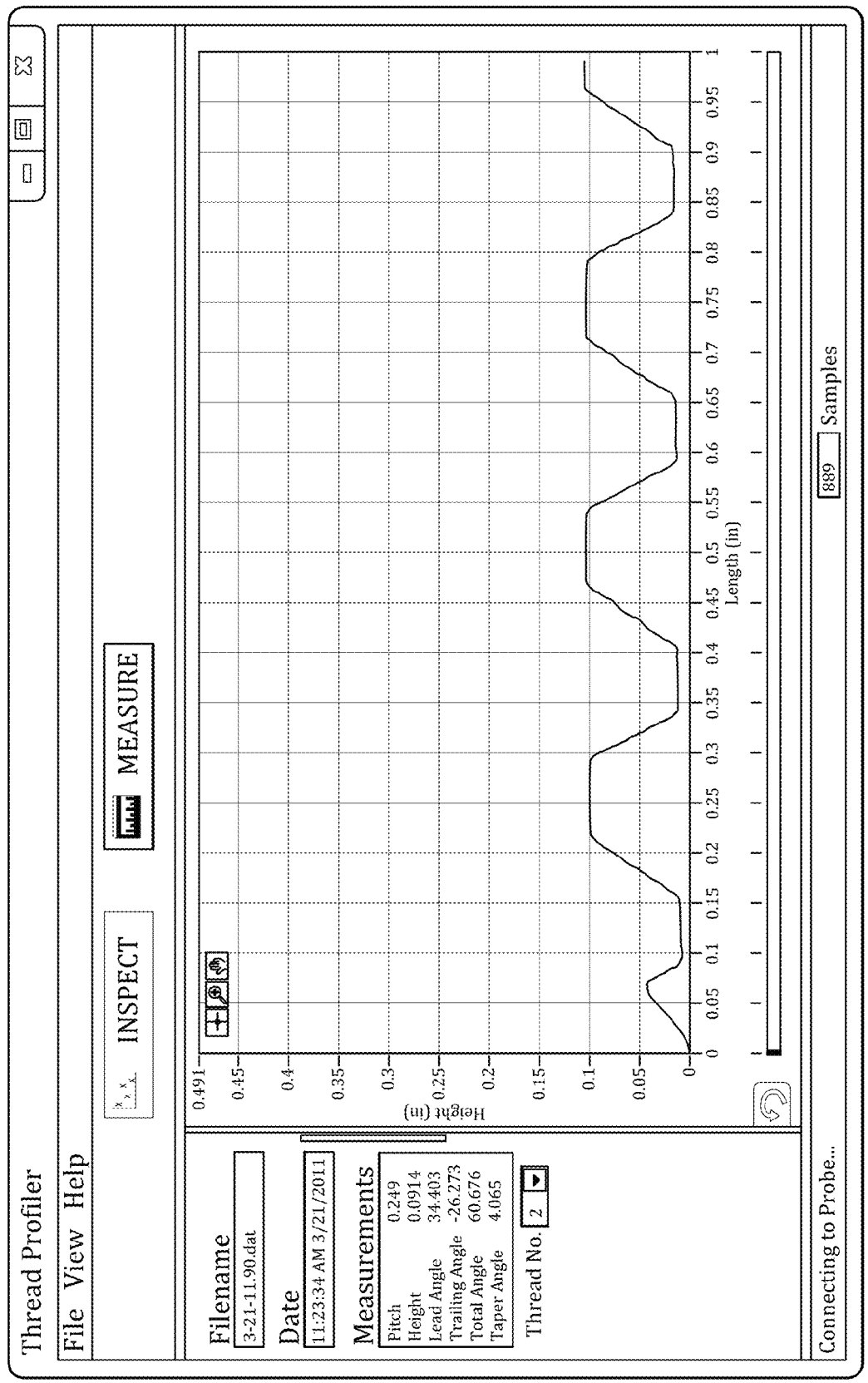
FIG. 10 is a screen shot of a thread profile generated on a computer screen using data generated by a thread profiler in accordance with aspects of the present disclosure.

Exemplary output data of a measure thread profile is shown in FIG. 10. From such a data set, various aspects of the measure thread can be determined, including items such as the root to crest distance, machining imperfections or wear that cause malformed or rounded flanks and crests, thread pitch, deviations in the taper, and flank angle.

Figure 13:
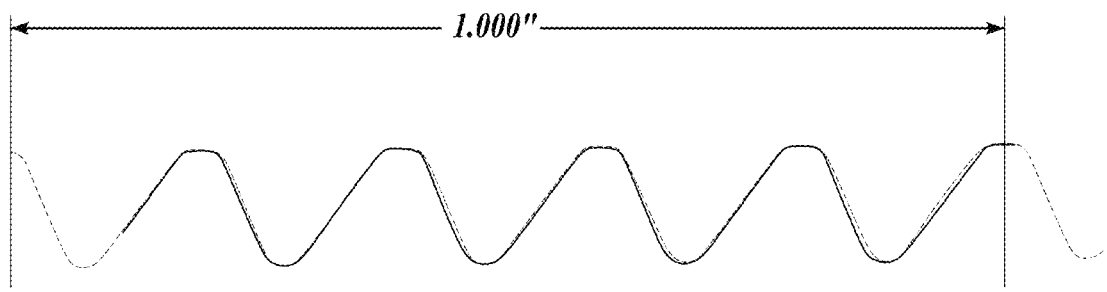

FIGS. 11-13 are exemplary thread profiles obtained by measuring the referenced threads across a distance of 1.000". The thread forms include round coupling threads (FIG. 11); API thread (FIG. 12); and a full hole API thread (FIG. 13). Dashed lines are included as the theoretical ideal profile, which is typically indistinguishable from the measured profile, thereby illustrating the accuracy and precision of the profiler.

The exemplary embodiment is designed so that the PC can output a scaled digital file (currently in the industry standard .dxf file format) that can be printed and used to overlay with a theoretical profile of the thread shape to allow the inspector to determine if the profile meets manufacturing or refurbishment requirements. Alternatively, this comparison can be made automatically by the software, such as if the accept/reject criteria is encoded in the software. This "theoretical profile" information can be stored in the device using a database or similar scheme so that information can be easily stored and retrieved from the database for automatic comparison. In addition, the software can automatically highlight areas of concern on the profile and display the overlay to the operator. If desired, the database information can be encrypted, such as to protect the information from competitors, while still providing the comparison feature by not displaying the overall dimension and only highlighting and quantifying differences.

The thread profiler may have any suitable power supply and communication and display arrangements. In some embodiments, the thread profiler may be battery powered with wireless communications to the PC. In other embodiments, the thread profiler may include a USB connection between the thread profiler and the PC for providing power and communications capabilities. The thread profiler may include a display guiding the operation, with results displayed on the PC located near to the thread profiler. For another example, the thread profiler may be battery-powered or powered from an external source with built-in processing capabilities and built-in results display feature(s) ranging, for example, from a go/no go display to a full up zoomable results display. If desired, the detailed measurements can be queued into the device and later downloaded to a PC for storage or further analysis as needed. In some embodiments, the thread profiler can be "wi-fi" configured, such as to allow statistical process control (SPC) data to be tracked quickly or easily tied in with a manufacturing operation.

In one embodiment, the apparatus is configured to measure a plurality of measurement points along the measurement axis and the computer is configured to generate a radial cross-sectional profile (a "measured profile") of the internally threaded surface along the measurement axis using the measurements of the plurality of measurement points.

In one embodiment, the computer is configured to compare the radial cross-sectional profile to an ideal profile in order to determine deviations between the profiles. By comparing an ideal profile to the measured profile allows defects to the shape of the threads to be determined. Such defects include items such as the root to crest distance, machining imperfections or wear that cause malformed or rounded flanks and crests, thread pitch, deviations in the taper, and/or flank angle.

In certain embodiments, the thread profiler includes built-in self-calibration features for a minimum of one or more heights and a built-in mechanical "dead zone" on mechanism travel (similar to a camera shutter delay) to ensure vibrations due to handling will dampen before data is collected. For example, this may allow time for the operator to manually initiate the scan and remove his/her hand before the motion starts.

In one embodiment, the optical head is configured such that the triangulation plane rotated about the line parallel to the tangent of the cylindrical cross-section within the triangulation plane that is substantially perpendicular to both the measurement axis and the central axis, within normal variations of the helix angle. This changes the "look" angle to allow acute or negative flank angles to be measured. This typically would require two optical heads to be used, one for the leading flank and one for the trailing flank. The "look" angle may be different depending of the leading and trailing flank angles. Accordingly, in certain embodiments, a second light source and a second detector, paired together, are incorporated into the apparatus.

In one embodiment, the apparatus is configured to adjust a parameter selected from the group consisting of light source power, light source pulse width, detector exposure time, and combinations thereof. The amount of light scattered from the surface of the thread can vary significantly depending on the surface finish and relative angles between the laser, receive axis and thread surface. This often will require a combination two or three of the above items. In one embodiment, the light source power is continuously adjusted as the measurements are collected, while the detector exposure can be modified between measurement to accommodate newly manufactured threads as compared to used threads. There also may be variations in the detected light levels due to the geometry of specific thread types.

In one embodiment, the apparatus is capable of measuring threads having a thread flank angle of from 45 to −10 degrees, as measured from a line perpendicular to the taper angle.

In another aspect, a method of measuring a profile of an internally threaded surface using the apparatus of claim 1 is provided. In one embodiment, the method includes the steps of:

(a) positioning the optical head on the measurement axis;
(b) moving the optical head on the measurement axis adjacent the internally threaded surface;
(c) irradiating a plurality of measurement points along the internally threaded surface using the first light source; and
(d) detecting scatter light generated at the plurality of measurement points by the first light source to provide a plurality of detector signal measurements; and
(e) determining a plurality of distance measurements, each indicative of the distance from the optical head to a measurement point, using the plurality of detector signal measurements.

An exemplary operational procedure for measuring a thread profile includes:

The operational sequence of the tool is as follows:

1. Select the depth within the thread where the profile data will be collected. For example, the tool can begin collection at 1.5, 2.5 or 3.5 inches from the face of the pipe end. This can be accomplished by physically adjusting the position of the motion stage in relation to where the profiler contacts the pipe end.

2. Insert the profiler into the internally thread part until the front reference paddles evenly contact the face of the pipe. It is important both paddles are flush with the face of the pipe to keep the measurement axis in the same plane as the central thread axis.

3. Rotate the knob below the unit until the reference surface contacts the outside of the internally threaded pipe. This clamps the profiler to the part and ensures there is no relative motion between the pipe and the profiler during the measurement.

4. Pull the knob at the base of the handle to retract the mechanism to the scan start location.

5. Prepare the interfaced computer to receive data from the profiler.

6. Squeeze the trigger on the profiler to begin the measurement cycle. The radial data is displayed in real-time on the screen over the one inch axial length of travel.

7. Once the data is collected, the software can automatically overlay the theoretical profile on the data collected. Variations can be noted by the software.

In one embodiment, moving the optical head is synchronized with irradiating the plurality of measurement points, so as to coordinate the plurality of distance measurement with a specific position of the optical head on the measurement axis for each of the plurality of measurement points.

In one embodiment, moving the optical head is synchronized with detecting the scattered light from the plurality of measurement points, so as to coordinate the plurality of distance measurements with a specific position of the optical head on the measurement axis for each of the plurality of measurement points. Such coordination allows, for example, the measurements to be taken at consistent positions from thread to thread (e.g., the same number of data points on each flank, crest, and root.

In one embodiment, moving the optical head comprises circular movement around the circular latitudinal cross-section or the helix angle of the internally threaded surface.

In one embodiment, the method further comprises the step of adjusting a parameter selected from the group consisting of light source power, light source pulse width, detector exposure time, and combinations thereof.

In one embodiment, the method further comprises the step of generating a profile of the internally threaded surface from the plurality of distance measurements.

In one embodiment, the method further comprises the step of comparing the generated profile to an ideal profile.

While the above described embodiments are used for characterizing (e.g., profiling) an internally threaded surface, embodiments of the present disclosure may be used in a thread profiler for characterizing external threads. For example, the mechanism used to clamp the device on the thread component can be modified to allow the optical measurement head to be positioned on the outside of the thread and to scan axially.

Accordingly, in another aspect, an apparatus configured to measure at least one physical characteristic of a threaded surface of an object is provided. The threaded surface includes a central axis of the object defined by a plurality of crests of the threaded surface in the longitudinal direction of the internally threaded surface, wherein the threaded surface has a cylindrical latitudinal cross-section. In one embodiment, the apparatus includes:

(1) at least one motion stage configured to controllably move an optical head along a measurement axis of the threaded surface, wherein the measurement axis is defined by a plurality of crests of the threaded surface in the longitudinal direction of the threaded surface and the central axis lie in a common plane; and (2) the optical head, comprising:

(i) an emission optical element in optical communication with a first light source configured to emit a first incident light beam onto the threaded surface to generate scattered light off of the threaded surface at a measurement point;

(ii) a detector optical element in optical communication with a first detector configured to receive at least a portion of the scattered light from the measurement point, wherein the detector optical element has a receive axis defined by the measurement point, the detector optical element, and the first detector, and wherein the first detector is configured to output a detector signal indicative of the intensity and position of the scattered light on the detector;

wherein the optical head is configured and disposed such that the first incident light beam and the receive axis form a triangulation plane along with the measurement point on the threaded surface, and wherein a line parallel to a tangent of the cylindrical cross-section within the triangulation plane is substantially perpendicular to both the measurement axis and the central axis; and wherein the apparatus is configured to register to the threaded surface by making physical contact with the object in a plurality of contact locations, including at least two longitudinally spaced contact locations on the threaded surface.

Embodiments of this aspect are similar to those set forth above and described with reference to an internally threaded surface. The thread profiler can be "reversed" and also used on an externally threaded surface according to the same geometric constraints as when the profiler is used on internal threads.

While illustrative embodiments have been illustrated and described, it will be appreciated that various changes can be made therein without departing from the spirit and scope of the invention.

The invention claimed is:

1. An internal thread measurement apparatus for measuring at least one physical characteristic of an internally threaded surface of an object, the apparatus comprising:
a body including a support member and an external contact, wherein the support member comprises a plurality of contact surfaces configured to register to the internally threaded surface of the object, wherein said registration of the contact surfaces defines a registration plane, and wherein the external contact is configured to make physical contact with an external surface of the object; and at least one motion stage configured to controllably move an optical head along a measurement axis that is substantially parallel to the registration plane, wherein the optical head comprises:
an emission optical element configured to emit a first incident light beam onto the internally threaded surface to generate scattered light off of the internally threaded surface; and
a detector configured to receive at least a portion of the scattered light.

2. The apparatus of claim 1, wherein the apparatus consists of a portable device.

3. The apparatus of claim 1, wherein the apparatus consists of a handheld device.

4. The apparatus of claim 1, wherein the apparatus is configured to perform measurements while being held in a hand.

5. The apparatus of claim 1, wherein the detector is configured to output a detector signal indicative of the received scattered light.

6. The apparatus of claim 1, wherein the support member comprises at least two distal contact surfaces and at least two proximal contact surfaces.

7. The apparatus of claim 1, wherein the at least two distal contact surfaces and the at least two proximal contact surfaces each extend parallel to the measurement axis.

8. The apparatus of claim 1, wherein the apparatus is configured to register to an internally threaded surface that comprises a tapered thread.

9. The apparatus of claim 1, wherein the internally threaded surface of an object comprises a tapered thread.

10. The apparatus of claim 1, wherein the apparatus is capable of measuring threads having a thread flank angle of from 45 to −10 degrees.

11. The apparatus of claim 1, wherein the measurement axis is substantially parallel to a taper angle of the internally threaded surface such that the measurement axis and a central axis of the object are not parallel.

12. The apparatus of claim 1, wherein the emission optical element is in optical communication with a first light source.

13. The apparatus of claim 12, wherein the emission optical element is a fiber optic in optical communication with the first light source.

14. The apparatus of claim 1, wherein at least one parameter of the light source is adjusted during a measurement.

15. The apparatus of claim 1, wherein the apparatus further comprises means for wirelessly transmitting measurement information.

16. The apparatus of claim 1, further comprising:
a second optical head, wherein the optical head and the second optical head are configured to be tilted to measure acute or negative flank angles.

17. The apparatus of claim 1, further comprising:
a calibration unit configured to calibrate the optical head.

18. A method of measuring a profile of an internally threaded surface using an apparatus, the method comprising the steps of:
(a) registering, by the apparatus, the internally threaded surface of the object to define a registration plane;
(b) positioning an optical head of the apparatus on a measurement axis, wherein the measurement axis is substantially parallel to the registration plane;
(c) moving the optical head on the measurement axis;
(d) irradiating, by the apparatus, a plurality of measurement points along the internally threaded surface using a first light source of the apparatus;
(e) detecting, by the apparatus, scatter light generated at the plurality of measurement points by the first light source to provide a plurality of detector signal measurements; and
(f) determining a plurality of distance measurements, each indicative of the distance from the optical head to a measurement point, using the plurality of detector signal measurements.

19. The method of claim 18, further comprising performing at least one of steps (a) through (e) while the apparatus is held in a human hand.

20. The method of claim 18, wherein the apparatus further comprises a finger actuated trigger, and wherein the method further comprises initiating said moving the optical head with the finger actuated trigger.

21. The method of claim 18, further comprising wirelessly transmitting measurement information to a computing device having a display.

22. The method of claim 18, further comprising:
determining a corrected exposure using the plurality of detector signal measurements.

23. The method of claim 22, wherein the corrected exposure is determined based on one or more of a known reflection pattern or a known thread geometry.

24. The method of claim 18, wherein registering the internally threaded surface of the object comprises contacting, by a robotic system, reference points on the object and wherein positioning the optical head of the apparatus on the measurement axis comprises positioning, by the robotic system, the optical head with respect to the reference points.

25. The method of claim 18, further comprising moving the optical head around one or more of a circular latitudinal cross-section of the internally threaded surface or a helix angle of the internally threaded surface.

26. A handheld apparatus for measuring a profile of an internally threaded surface comprising:
means for registering the internally threaded surface to define a registration plane;
means for positioning an optical head;
means for moving the optical head on a measurement axis adjacent the internally threaded surface, wherein the measurement axis is substantially parallel to the registration plane;
means for irradiating a plurality of measurement points along the internally threaded surface using a first light source;
means for detecting scatter light generated at the plurality of measurement points by the first light source to provide a plurality of detector signal measurements; and
means for generating the thread profile of the internally threaded surface based on the plurality of detector signal measurements.

* * * * *